US009325226B2

(12) United States Patent
Zhang et al.

(10) Patent No.: US 9,325,226 B2
(45) Date of Patent: Apr. 26, 2016

(54) ELECTRIC MOTOR HAVING A COMMUTATOR AND BRUSHES IN SLIDING CONTACT THEREWITH

(75) Inventors: Weirong Zhang, Shanghai (CN); Christof Frick, Shanghai (CN); Zhendong Mi, Shanghai (CN); Guoxian Wu, Shanghai (CN)

(73) Assignee: Brose Fahrzeugteile GmbH & Co. KG, Wurzburg, Wurzburg (DE)

( * ) Notice: Subject to any disclaimer, the term of this patent is extended or adjusted under 35 U.S.C. 154(b) by 879 days.

(21) Appl. No.: 13/239,130

(22) Filed: Sep. 21, 2011

(65) Prior Publication Data
US 2013/0069463 A1 Mar. 21, 2013

(51) Int. Cl.
*H02K 5/14* (2006.01)
*H02K 13/00* (2006.01)

(52) U.S. Cl.
CPC .......... *H02K 13/006* (2013.01); *H02K 2205/06* (2013.01)

(58) Field of Classification Search
CPC ..... H02K 2205/06; H02K 5/14; H02K 5/141; H02K 5/143; H02K 11/0015; H02K 11/0021
USPC ......................................... 310/68 B, 90, 90.5
See application file for complete search history.

(56) References Cited

U.S. PATENT DOCUMENTS

| 3,001,271 | A | * | 9/1961 | Perrin | 29/283 |
| 3,331,642 | A | * | 7/1967 | Krauss | 384/153 |
| 5,565,721 | A | * | 10/1996 | Knappe | 310/68 B |
| 6,127,752 | A | * | 10/2000 | Wiesler | 310/68 B |
| 6,340,856 | B1 | * | 1/2002 | Schiller | 310/68 D |
| 2002/0113512 | A1 | * | 8/2002 | Suzuki et al. | 310/154.22 |
| 2007/0216241 | A1 | * | 9/2007 | Ortoman et al. | 310/68 R |

FOREIGN PATENT DOCUMENTS

EP 0 918 996 6/1999
EP 0 918 996 B1 6/1999

\* cited by examiner

*Primary Examiner* — Michael Andrews
(74) *Attorney, Agent, or Firm* — Lewis Roca Rothgerber Christie LLP

(57) ABSTRACT

An electric motor for moving a vehicle part, the electric motor having a stator with a stator housing, a drive shaft rotatable with respect to the stator, a rotor on the drive shaft and having a rotor winding, a commutator on the drive shaft for supplying an electric current to the rotor winding, at least two brushes mounted on the stator housing, the brushes in sliding contact with the commutator for supplying electric current to the rotor winding, a bushing mounted on the drive shaft adjacent to the commutator, and a cone element mounted on the drive shaft adjacent to the bushing on a side of the bushing facing away from the commutator, the cone element having an outer surface which conforms to the shape of a cone concentrical to the drive shaft and having a tip pointing away from the bushing.

10 Claims, 3 Drawing Sheets

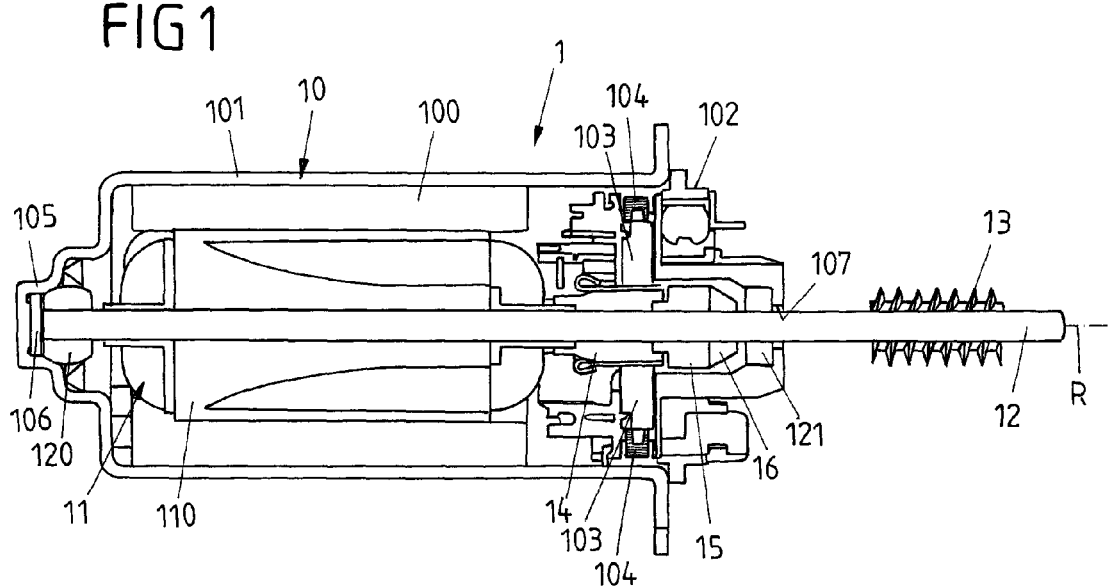
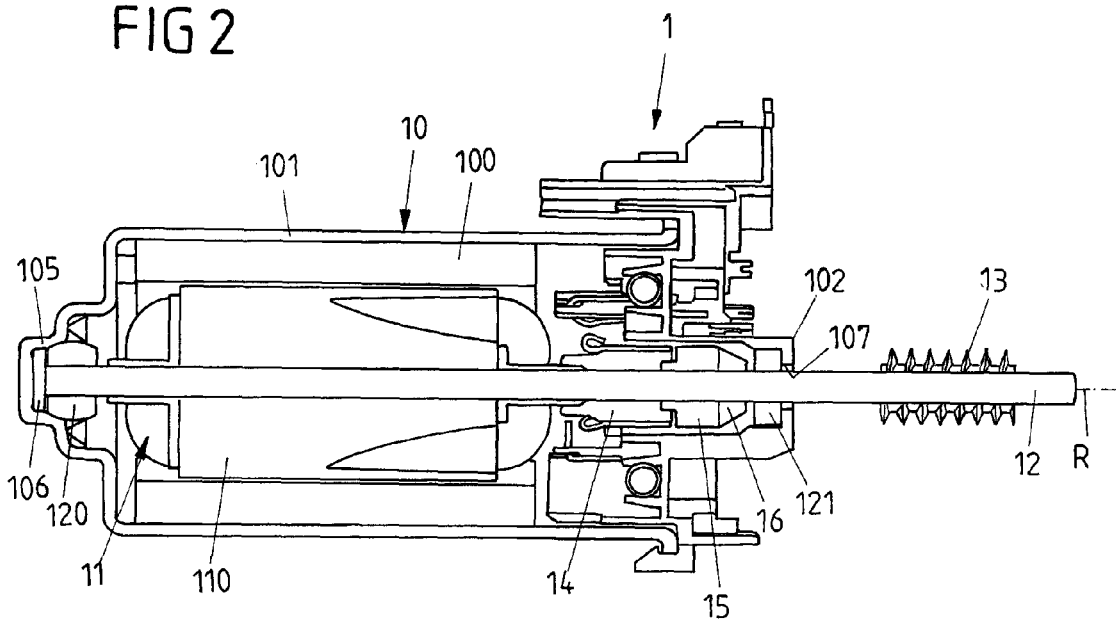

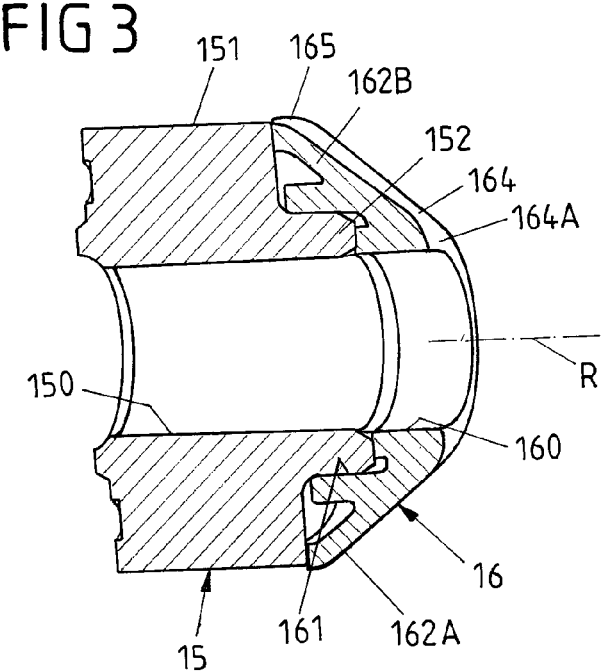
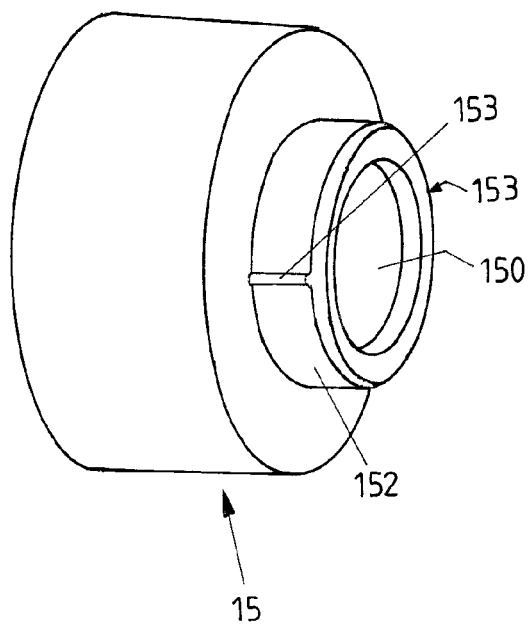
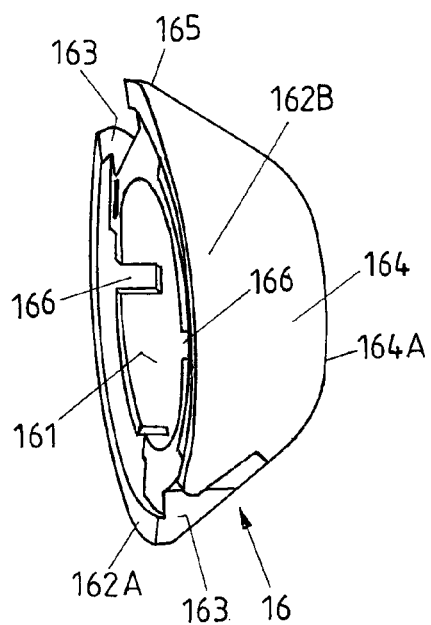

ELECTRIC MOTOR HAVING A COMMUTATOR AND BRUSHES IN SLIDING CONTACT THEREWITH

FIELD OF THE INVENTION

The invention generally relates to electric motors for a drive device for moving a vehicle part relative to another vehicle part, for example for moving a vehicle seat or a part of a vehicle seat, for moving a part of a vehicle door or any other vehicle part.

BACKGROUND OF THE INVENTION

An electric motor of this kind comprises a stator having a stator housing, a drive shaft which is rotatable with respect to the stator about an axis of rotation, a rotor which is mounted on the drive shaft and comprises at least one rotor winding, and a commutator mounted on the drive shaft for supplying an electric current to the at least one rotor winding of the rotor during operation of the electric motor. On the stator housing, at least two brushes are mounted which are in sliding contact with the commutator for supplying the electric current to the at least one rotor winding during operation of the electric motor.

An electric motor of this kind is for example known from EP 0 918 996 B1.

In such electric motors, during assembly the brushes mounted on the stator housing must be brought into sliding contact with the commutator mounted on the drive shaft. Typically, such brushes are mounted on the stator housing in a pre-tensioned manner, for example by using spring elements such that, in an assembled state of the electric motor, the brushes are radially pushed against the commutator in an elastic manner. For assembly, however, this means that the brushes must be radially displaced outwards such that the commutator can be inserted between the brushes for bringing the brushes into radial contact with an outer cylindrical surface of the commutator.

Conventionally, for radially displacing the brushes during assembly, a specific tool is used which pushes the brushes radially outwards and holds the brushes in a radially displaced position such that the commutator can be inserted in an assembly direction pointing along the axis of rotation between the brushes. This, however, may complicate the assembly and may lead to additional working steps during assembly.

Hence, EP 0 918 996 B1 proposes to place a magnetic rotor body on the drive shaft in front of the commutator, the magnetic rotor body having an incline which is designed such that the brushes are pushed apart from one another when a brush holder is pushed onto the drive shaft during the assembly process.

A possible drawback herein may be that the forming of the magnetic rotor body with an incline may increase costs in the production of the magnetic rotor body.

SUMMARY OF THE INVENTION

It is an object of the invention to provide an electric motor which in an easy and cost-efficient manner allows for the assembly of brushes on a commutator without the need for specific tools during the assembly process.

This object is achieved with an electric motor comprising the features of claim 1.

In an embodiment of such an electric motor, the electric motor comprises a bushing mounted on the drive shaft adjacent to the commutator, and a cone element mounted on the drive shaft adjacent to the bushing on a side of the bushing facing away from the commutator, the cone element having an outer surface which at least in parts conforms to the shape of a cone being concentrically to the drive shaft and having a tip pointing away from the bushing.

Using a cone element mounted adjacent to a bushing and hence forming a separate element to the bushing, an incline is provided onto which the brushes may slide during assembly of the electric motor such that the brushes are pushed apart when the drive shaft with the cone element mounted thereon is inserted between the brushes along the axis of rotation. Via the bushing the brushes can then slide onto the commutator and hence can be brought into sliding contact with the commutator.

Because the bushing and the cone element are formed as separate elements, the production both of the bushing and of the cone element can be achieved in a cost-efficient manner.

The bushing, in one embodiment, can be mounted adjacent to the commutator on a side of the commutator facing away from the rotor. Hence, an arrangement arises in which, when viewed along the axis of rotation, the cone element, the bushing, the commutator and the rotor—in that sequence—are aligned on the drive shaft.

The bushing, in one embodiment, may comprise a magnet and, hence, may function as a signal source in combination for example with a Hall sensor for detecting the motion and/or position of the rotor during operation of the electric motor. In this regard, the bushing may for example be constituted by a ring magnet surrounding the drive shaft.

In another embodiment, the outer surface of the cone element deviates from the shape of the cone in the region of at least one recess formed by an indentation in the outer surface of the cone element. The cone element with its outer surface, hence, in general conforms to the shape of a cone. On the outer surface, however, one or multiple recesses are arranged formed by indentations such that the outer surface is interrupted at certain locations.

By means of the recesses it may be achieved that during assembly of the bushing and the cone element on the drive shaft a tool may reach through the cone element to act onto the bushing for press-fitting the bushing onto the shaft.

In one embodiment, the cone element may comprise a central bore formed in an element body of the cone element, the drive shaft extending through the central bore. Further, the cone element may comprise at least one cone segment projecting from the element body, wherein an outer surface of the at least one cone segment conforms to the shape of the cone and wherein the cone segment, when viewed in a circumferential direction around the axis of rotation, borders a recess.

In one embodiment, the cone element may comprise two symmetrical cone segments diametrically opposite to each other with respect to the drive shaft and each protruding from the element body, wherein the symmetrical cone segments are separated from each other when viewed along a circumferential direction around the axis of rotation, by recesses formed by indentations in the outer surface of the cone element.

In another embodiment, the cone element may by rounded in the region of the tip of the cone such that the cone element, when viewed in cross-section perpendicular to the axis of rotation, has a convex shape in the region of the tip of the cone. By using such a rounded, convex-shaped tip it may by achieved that the brushes, during assembly of the electric motor, in an easy way may slide onto the cone element, hence facilitating the assembly process.

In another embodiment, the cone element axially abuts the bushing and, hence, axially is in contact with the bushing. For this, the cone element may be mounted on a flange of the bushing such that the flange of the bushing engages an inner bore of the cone element. In this regard, the cone element may be press-fitted onto the flange of the bushing such that the cone element is held in tight connection with the bushing.

The bushing and the cone element may be formed of different materials. The bushing may for example be fabricated using a metal such as steel, or using a magnetic material for providing a signal source in combination with a Hall sensor. The cone element may be made of plastic, wherein it is also conceivable to fabricate the cone element from metal, such as aluminium or steel.

The cone element, in another embodiment, may be mounted on the drive shaft between the bushing and a bearing. The cone element, thus, may serve the additional purpose of functioning as limiting an axial play of the drive shaft in that the cone element may be in axial contact with the bearing and hence may support the axial position of the drive shaft.

BRIEF DESCRIPTION OF THE DRAWINGS

Other advantages of the present invention will be readily appreciated from the following detailed description of the invention when considered in connection with the accompanying drawings, wherein:

FIG. 1 shows a partially cut-view of an electric motor;

FIG. 2 shows another partially cut-view of the electric motor, rotated with regard to the view of FIG. 1 by about 90° about an axis of rotation;

FIG. 3 shows a partially cut-view of a bushing and a cone element of the electric motor;

FIG. 4A shows a separate view of the bushing;

FIG. 4B shows a separate view of a cone element;

DETAILED DESCRIPTION OF THE INVENTION

Figure 5:
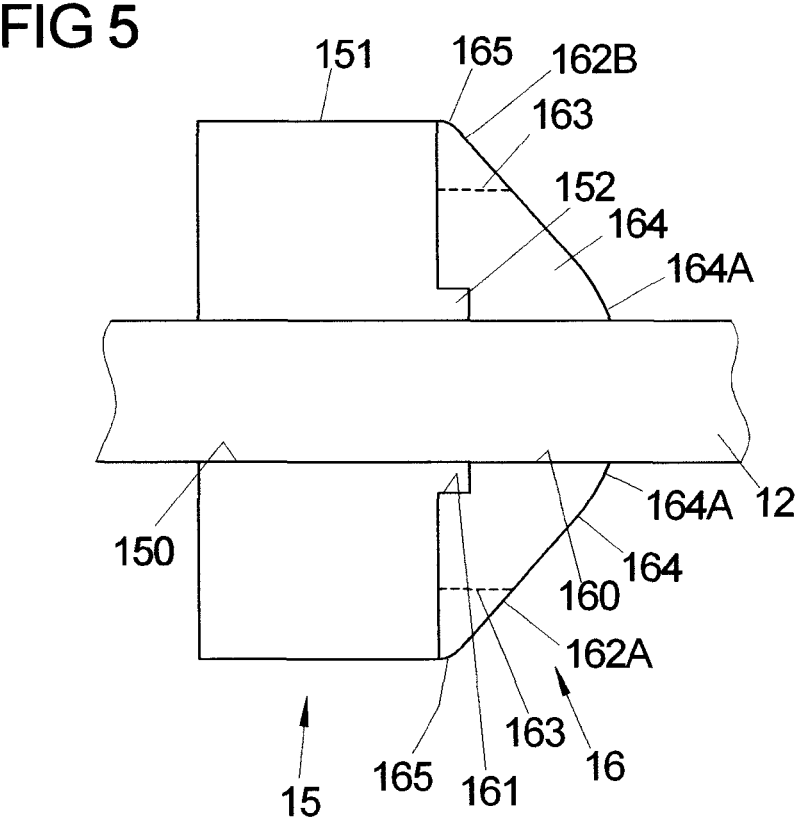
FIG. 5 shows a schematic cut-view of the bushing and the cone element mounted on the drive shaft.

FIGS. 1 and 2 in partially cut-views show an electric motor 1 having a stator 10 with a stator housing 101 and a rotor 11 mounted on a drive shaft 12. The rotor 11, via the drive shaft 12, herein is mounted rotatably with respect to the stator 10 and carries rotor windings 110 which, in operation of the electric motor 1, are supplied with an electric current causing a magnetic field interacting with stator magnets 100 of the stator 10 to rotate the rotor 11 about an axis of rotation R with respect to the stator 10.

The drive shaft 12 is mounted via bearings 120, 121 on the stator housing 101. The bearing 120, herein, is positioned at a bearing position 105 of the stator housing 101, whereas the bearing 121 is placed at a cover element 102 in connection with the stator housing 101 and covering an axial opening of the stator housing 101. The drive shaft 12, at the location of the bearing position 105, abuts a washer disc 106 and hence is axially supported on the stator housing 101.

The drive shaft 12 carries a worm gear 13 which is fixedly mounted on the drive shaft and, during operation of the electric motor 1, is rotated to drive an appropriate gear wheel engaging the worm gear 13.

Further, the drive shaft 12 carries a commutator 14 which is in fixed connection with the drive shaft 12 and is electrically connected to the rotor windings 110. The commutator 14 serves to electrically supply the rotor windings 110 during operation of the electric motor 1 with an electric current and, for this, is in radial contact with a pair of brushes 103 mounted on the cover element 102 in a radially displaceable fashion.

The brushes 103 are in sliding contact with the commutator 14 such that the brushes 103 slide along an outer cylindrical surface of the commutator when the drive shaft 12 rotates with respect to the stator 10 during operation of the electric motor 1. Herein, the brushes 103 are elastically pre-tensioned with respect to the cover element 102 by means of a pair of spring elements 104 which push the brushes 103 radially inwards and, hence, against the commutator 14 for providing an electrical contact between the brushes 103 and the commutator 14.

The brushes 103 are electrically connected to an appropriate current supply circuitry such that via the brushes 103 and the commutator 14 a current may be fed to the rotor windings 110 for driving the rotor 11 with respect to the stator 10.

Because the brushes 103 are held on the cover element 102 serving as a brush holder in an elastically pre-tensioned manner to provide an abutment of the brushes 103 on the outer surface of the commutator 14 under a pre-tension, for assembling the brushes 103 on the commutator 14 the brushes 103 must be displaced radially outwards such that the commutator 14 can be inserted in an assembly direction pointing along the axis of rotation R between the brushes 103.

For assembling the drive shaft 12 with the attached rotor 11 and the commutator 14 is for example in a first step placed in the stator housing 101, and in a second step the cover element 102 with the brushes 103 is attached to the stator housing 101. Alternatively, the drive shaft 12 in a first step may be connected to the cover element 102 to then attach the cover element 102 together with the drive shaft 12 and the rotor 11 mounted on the drive shaft 12 in a second step to the stator housing 101.

In any case, for assembling the cover element 102 on the drive shaft 12, the brushes 103 must be radially separated so that the commutator 14 can be inserted between the brushes 103. For this, adjacent to the commutator 14 on a side of the commutator 14 facing away from the rotor 11, a bushing 15 and a cone element 16 are provided which may serve to facilitate the assembly of the brushes 103 on the commutator 14.

The bushing 15, as shown in FIG. 3 and FIG. 4A, has a generally cylindrical shape and may for example be fabricated from metal, for example steel.

The cone element 16, as shown in FIG. 3 and FIG. 4B, abuts the bushing 15 and conforms with its outer surface at least partially to the shape of a cone being concentrical, with its axis of rotational symmetry, to the axis of rotation R and pointing away from the commutator 14.

By shaping the cone element 16 at least partially as a cone, the cone element 16 serves as an inclined ramp onto which the brushes 103 may slide for bringing them into contact with the commutator 14. During assembly, then, the drive shaft 12 together with the cone element 16, the bushing 15 and the commutator 14 mounted thereon is inserted into an opening 107 of the cover element 102 along the axis of rotation R such that the brushes 103 slide onto the outer surface of the cone element 16 and, hence, are radially separated and, by gliding across the bushing 15, are brought into sliding contact with the commutator 14.

The cone element 16 may for example be fabricated from plastic. The cone element 16 comprises an element body 164 and two symmetrical cone segments 162A, 162B projecting from the element body 164, the cone segments 162A, 162B being separated from each other, when viewed in a circumferential direction around the axis of rotation R, by recesses 163 forming indentations in the outer surface of the cone element 16.

The recesses 163 may serve to provide an access to the bushing 15 during mounting of the bushing 15 and the cone element 16 on the drive shaft 12 for example to allow bringing a tool into engagement with the bushing 15 for press-fitting the tool 15 on the drive shaft 12. In addition, the recesses 163 may serve to allow for an easy positioning of the cone element 16 on the drive shaft 12 by for example bringing it into engagement with protrusions on the bushing 15 (not shown) and hence defining the rotational position of the cone element 16 with respect to the bushing 15.

The cone element 16 is in axial contact with the bushing 15 and, via an inner bore 161, is press-fitted onto a flange 152 of the bushing 15. For this, the cone element 16, in the region of its inner bore 161, is at least to some extent elastic.

On the flange 152 two bar-like protrusions 153 pointing along the axis of R are arranged which serve as a counter measure against rotational movement of the cone element 16 with respect to the bushing 16. In a mounted state the cone element 16 with recesses 166 engages the protrusions 153 such that the cone element 16 is held on the flange 152 in a rotationally fixed manner.

Both the bushing 15 and the cone element 16 comprise a central bore 150 respectively 160 through which, in an assembled state of the electric motor 1, the drive shaft 12 extends such that the bushing 15 and the cone element 16 are fixedly mounted on the drive shaft 12.

The inner bore 161 via which the cone element 16 is fitted onto the flange 152 of the bushing 15 herein adjoins the central bore 160 of the cone element 16 and defines a section of the central bore 160 with an increased diameter.

The outer surface of the element body 164 and the cone segments 162A, 162B of the cone element 16 conform to the shape of a cone such that a ramp for bringing the brushes 103 into contact with the commutator 14 is provided. In this regard, to allow for an easy sliding of the brushes 103 onto the cone element 16, the cone element 16 may be rounded at its tip 164A pointing away from the bushing 15 such that, as shown in FIG. 5, the cone element 16, when viewed in cross-section perpendicular to the axis of rotation R, has a convex shape in the region of the tip 164A.

Furthermore, the cone element 16 may also be rounded but its outer edge 165 (at the far end of the cone segments 162A, 162B) to provide a continuous transition to the bushing 15.

Figure 6:
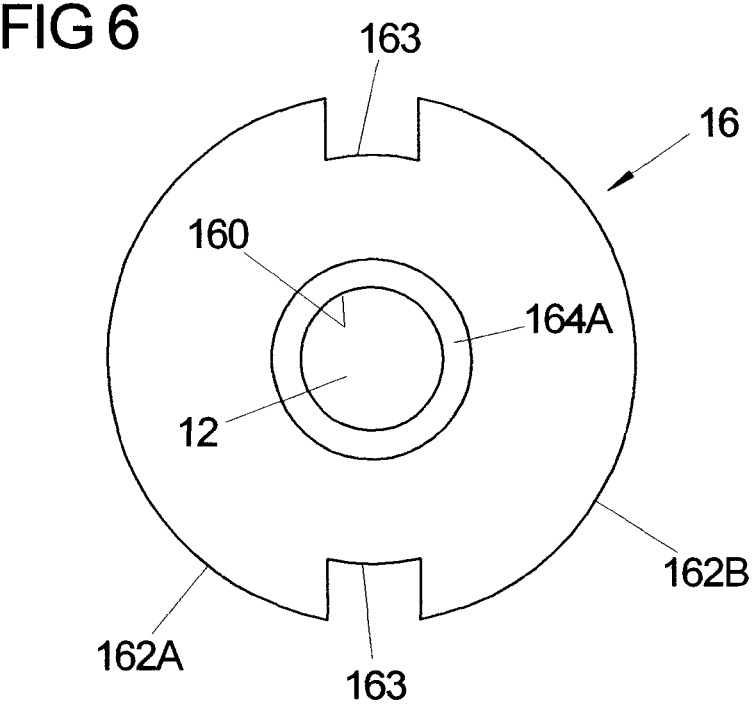
FIG. 6 shows a front view viewed along the axis of rotation of the cone element.

FIG. 6 shows, in a front view, another view of the cone element 16 illustrating the separation of the cone segments 162A, 162B by the recesses 163 along the circumferential direction.

The bushing, as stated above, may be fabricated from steel. It also is possible, however, to fabricate the bushing 15 at least in part using a magnetic material such that the bushing 15 may provide, in combination with a Hall sensor mounted on the cover element 102, a signal source for measuring the position and/or speed of rotation of the rotor 11.

The bushing 15 and the cone element 16 are placed, when viewed along the axis of rotation R, between the commutator 14 and the bearing 121. In this regard it may be provided that the cone element 16 is in axial abutment with the bearing 121 such that the cone element 16 also serves for limiting an axial play of the drive shaft 12 during operation of the electric motor 1.

The idea underlying the invention is not limited to the specific embodiments described above. Rather, the invention may also be used in embodiments of an entirely different kind.

In particular, the cone element needs to conform to the shape of the cone only in such regions along which the brushes slide during assembling of the electric motor. Hence, the cone element does not, in its entirety, need to conform to the shape of a cone.

The cone element and the bushing are provided as separate elements mounted on the drive shaft. Herein, it is not necessary that the bushing and the cone element abut, but it also is conceivable that a space in the axial direction along the axis of rotation is provided between the bushing and the cone element.

What is claimed is:

1. An electric motor for a drive device for moving a vehicle part relative to another vehicle part, the electric motor comprising:
   a stator comprising a stator housing;
   a drive shaft being rotatable with respect to the stator about an axis of rotation;
   a rotor mounted on the drive shaft and comprising at least one rotor winding;
   a commutator mounted on the drive shaft for supplying an electric current to the at least one rotor winding of the rotor during operation of the electric motor;
   at least two brushes mounted on the stator housing, the brushes being in sliding contact with the commutator for supplying the electric current to the at least one rotor winding during operation of the electric motor;
   a bushing mounted on the drive shaft adjacent to the commutator, wherein the bushing comprises a first bore through which the drive shaft extends such that the bushing is in direct contact with the drive shaft and wherein the bushing is press-fitted onto the drive shaft; and
   a cone element mounted on the drive shaft adjacent to the bushing on a side of the bushing facing away from the commutator, the cone element having an outer surface which at least in part conforms to the shape of a cone being concentrical to the drive shaft and having a tip pointing away from the bushing, wherein the cone element comprises a second bore through which the drive shaft extends, the second bore axially adjoining the first bore along the axis of rotation such that the cone element is in direct contact with the drive shaft, wherein the cone element, with a first side, faces the bushing;
   wherein the cone element comprises two symmetrical cone segments projecting from an element body, the cone segments being located diametrically opposite to each other with respect to the drive shaft and, when viewed along a circumferential direction around the axis of rotation, being separated from each other by recesses formed by indentations in the outer surface of the cone element, the recesses extending axially in parallel to the drive shaft in between the cone segments and ending at the first side of the cone element facing the bushing.

2. The electric motor according to claim 1, wherein the bushing is mounted adjacent to the commutator on a side of the commutator facing away from the rotor.

3. The electric motor according to claim 1, wherein the bushing comprises a ring magnet surrounding the drive shaft.

4. The electric motor according to claim 1, wherein the outer surface of the cone element deviates from the shape of the cone in a region of at least one recess formed by an indentation in the outer surface of the cone element.

5. The electric motor according to claim 1, wherein the cone element is rounded in a region of the tip of the cone such that the cone element, when viewed in cross section perpendicular to the axis of rotation, has a convex shape in the region of the tip of the cone.

6. The electric motor according to claim 1, wherein the cone element is mounted on a flange of the bushing such that the flange of the bushing engages an inner bore of the cone element.

7. The electric motor according to claim 6, wherein at least one protrusion is arranged on the flange, the at least one protrusion engaging at least one recess formed on the cone element at the inner bore and holding the cone element on the flange in a rotationally fixed manner.

8. The electric motor according to claim 6, wherein the cone element is press-fitted onto the flange of the bushing.

9. The electric motor according to claim 1, wherein the bushing and the cone element are formed by different materials.

10. The electric motor according to claim 1, wherein the cone element is mounted on the drive shaft between the bushing and a bearing.

* * * * *